United States Patent
Aitken et al.

(10) Patent No.: US 6,376,399 B1
(45) Date of Patent: *Apr. 23, 2002

(54) TUNGSTATE, MOLYBDATE, VANADATE BASE GLASSES

(75) Inventors: Bruce G. Aitken; Matthew J. Dejneka, both of Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,653

(22) Filed: Jan. 24, 2000

(51) Int. Cl.[7] .............................. C03C 3/12; C03C 3/17; C03C 3/21; H01S 3/17
(52) U.S. Cl. ............................ 501/41; 501/37; 501/46; 501/48; 359/341; 359/343; 372/6; 372/40
(58) Field of Search ................................ 501/37, 41, 46, 501/48; 359/341, 343; 372/6, 40

(56) References Cited

U.S. PATENT DOCUMENTS

| | | |
|---|---|---|
| 3,755,065 A | 8/1973 | Chvatal |
| 3,837,866 A | 9/1974 | Malmendier et al. |
| 3,853,568 A | 12/1974 | Chvatal |
| 4,529,540 A | 7/1985 | Uno et al. |
| 4,617,492 A | 10/1986 | Luthra |
| 4,741,849 A | 5/1988 | Naito et al. |
| 4,794,483 A | 12/1988 | Naito et al. |
| 4,945,071 A * | 7/1990 | Friesen et al. ................ 501/41 |
| 6,194,334 B1 * | 2/2001 | Aitken et al. ................ 501/41 |

FOREIGN PATENT DOCUMENTS

| | | | |
|---|---|---|---|
| GB | 761005 A | * | 11/1956 |
| JP | 0012810 A | * | 9/1962 |

* cited by examiner

Primary Examiner—David Sample
(74) Attorney, Agent, or Firm—Milton Peterson

(57) ABSTRACT

Alkali tungstate, molybdate and vanadate glasses, and telecommunications components embodying such glasses, the compositions of the glasses consisting essentially of 15–70 mol percent of at least one oxide selected from the group consisting of $WO_3$, $MoO_3$ and $VO_{2.5}$, 0–35% $CrO_3$, 0–15% $UO_3$, the total $WO_3$ plus $MoO_3$ plus $VO_{2.5}$ plus $CrO_3$ plus $UO_3$ being 50–70%, 20–50% $R_2O$ where R represents at least two elements selected from the group consisting of Li, Na, K, Rb, Cs, Ag and Tl, and optionally containing 0–10% MO where M is selected from the groups of elements consisting of Ca, Ba, Sr, Mg, Cd, Pb, 0–5 % $X_2O_3$ where x is at least one element selected from the group consisting of Al, Ga, In and Bi, 0–5% of at least one transition metal oxide, 0–15% $P_2O_5$ and/or $TeO_2$ and 0–5% of a rare earth oxide selected from the lanthanide series.

16 Claims, 5 Drawing Sheets

TUNGSTATE, MOLYBDATE, VANADATE BASE GLASSES

FIELD OF THE INVENTION

Glass compositions based on tungsten, molybdenum, and/or vanadium oxides, and opto-electronic components embodying such glasses

BACKGROUND OF THE INVENTION

Silica, boric oxide and phosphoric oxide are commonly recognized as glass-forming oxides. In contrast, oxides of tungsten and molybdenum are generally regarded as glass-modifying oxides, rather than glass-forming oxides.

In the case of tungsten and molybdenum, this is due, in part, to the propensity of the $W^{6+}$ and $Mo^{6+}$ ions to be octahedrally, rather than tetrahedrally, coordinated by oxygen (O). Consequently, the ion tends to act as a network modifying species.

Melts in silicate and borate systems that are rich in these oxides tend to crystallize spontaneously during cooling. However, corresponding melts in phosphate and tellurite systems that are rich in these oxides can be quenched at reasonable rates to the glassy state. This is particularly true if an alkali metal oxide is included in the melt.

Binary glasses in alkali metal tungstate, molybdate and vanadate composition systems have been melted and formed by employing unusually rapid quenching methods. Such glasses are of practical interest because of their unusual electrical properties, including high ionic conductivity, and electrochromic properties. However, their use has been severely limited by their marginal stability. This not only makes production of the glass difficult, but essentially makes it impossible to form bulk bodies, or articles of a practical size, from the glass.

It is then a basic purpose of the present invention to provide relatively stable tungstate, molybdate and vanadate glasses, that is, glasses having tungsten and/or molybdenum and/or vanadium oxides as glass-forming oxides.

It is a further purpose to provide tungstate, molybdate and vanadate glasses that can be melted and shaped in a practical manner.

Another purpose is to provide a component for a telecommunications system that is produced from a tungstate, molybdate, or vanadate glass.

To this end, it is a purpose to provide a tungstate, molybdate, or vanadate base glass that is completely transparent, or at least transparent to a useful degree, in the visible, as well as in the near infra-red, portions of the spectrum.

SUMMARY OF THE INVENTION

The invention resides in part in alkali tungstate, molybdate and vanadate glasses, the compositions of which consist essentially of 15–70 mol % of at least one oxide selected from the group consisting of $WO_3$, $MoO_3$, $VO_{2.5}$, 0–35% $CrO_3$, 0–15% $UO_3$, the total content of $WO_3$ plus $MoO_3$ plus $VO_{2.5}$ plus $CrO_3$ plus $UO_3$ being 50–70%, 20–50% $R_2O$ where R represents at least two elements selected from the group consisting of Li, Na, K, Rb, and Cs, Ag and Tl, optionally, 0–10% MO where M is an element selected from the group consisting Mg, Ca, Sr, Ba, Zn, Cd, and Pb, 0–5% $X_2O_3$ where x is at least one element selected from the group consisting of Al, Ga, In and Bi, 0–5% of at least one transition metal oxide, 0–15% $P_2O_5$ and/or $TeO_2$, and 0–5% of an oxide of a rare earth metal in the lanthanide series.

The invention further resides in a component for a telecommunications system embodying a glass having a composition which consists essentially of 15–70 mol percent of at least one oxide selected from the group consisting of $WO_3$, $MoO_3$, $VO_{2.5}$, 0–35% $CrO_3$, 0–15% $UO_3$, the total content of $WO_3$ plus $MoO_3$ plus $VO_{2.5}$ plus $CrO_3$ plus $UO_3$ being 50–70%, 20–50% $R_2O$ where R represents at least two elements selected from the group consisting of Li, Na, K, Rb, and Cs, Ag and Tl, and, optionally, 0–10% MO where M is an element selected from the group consisting of Mg, Ca, Sr, Ba, Zn, Cd, and Pb, 0–5% $X_2O_3$ where x is at least one element selected from the group consisting of Al, Ga, In and Bi, 0–5% of at least one transition metal oxide, 0–15% $P_2O_5$ and/or $TeO_2$, and 0–5% of an oxide of a rare earth metal of the lanthanide series.

The invention further resides in a method of producing a stable alkali tungstate, molybdate, or vanadate glass which comprises incorporating sources of at least two alkali metal oxides in the glass batch as modifying oxides.

BRIEF DESCRIPTION OF THE DRAWINGS

In the accompanying drawings.

DESCRIPTION OF THE INVENTION

Figure 1:
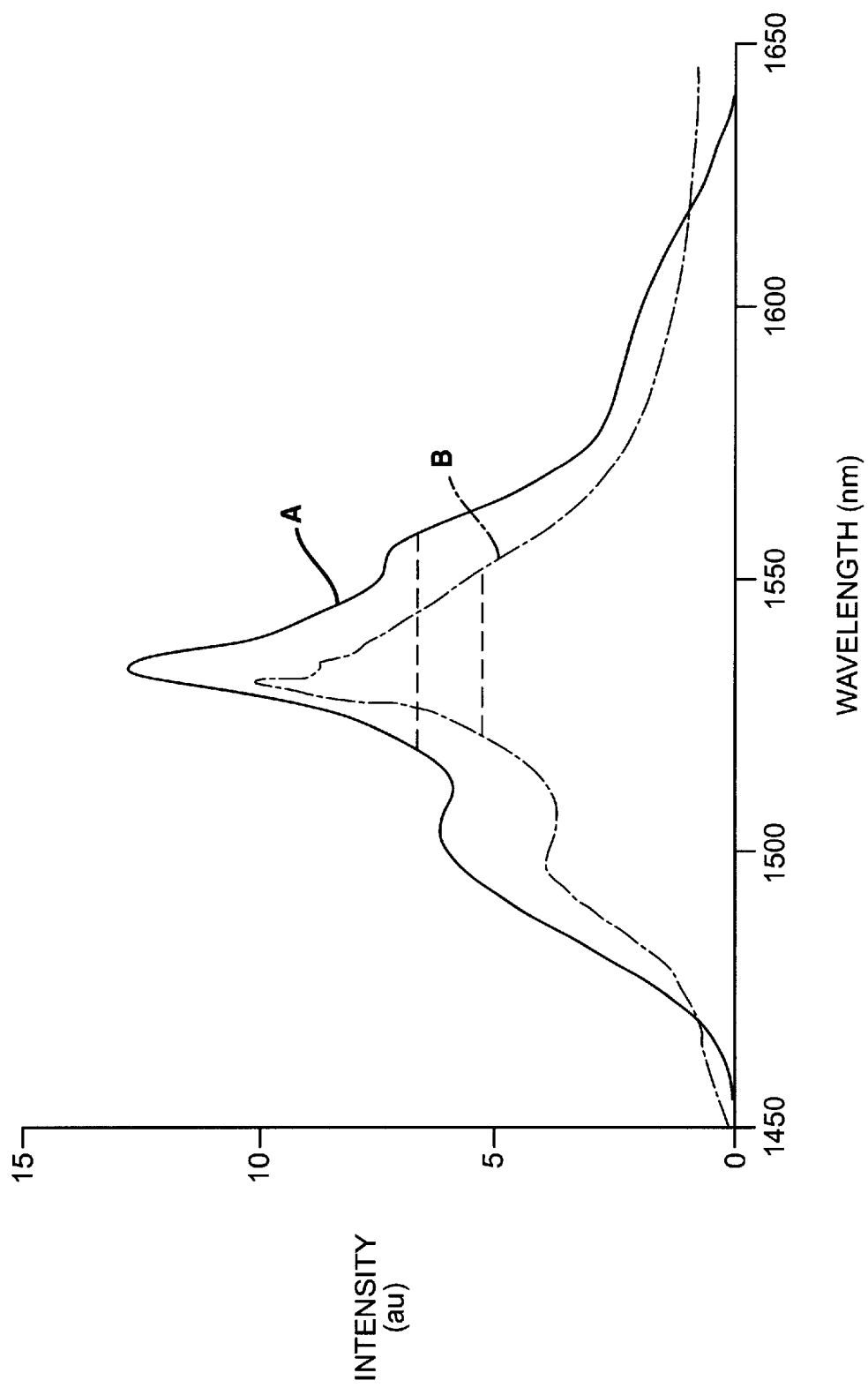
FIG. 1 is a graphical representation comparing the fluorescence of an erbium-doped glass of the present invention with that of a prior art, erbium-doped glass.

As indicated earlier, alkali tungstate, molybdate and vanadate, binary glasses, that is, glasses having two essential components in their composition, are known. However, these known glasses are very unstable, that is, they tend to devitrify when an attempt is made to cool the glass, even with quenching.

The present invention is predicated on discovery of alkali metal, tungstate, molybdate, and vanadate glasses that are relatively stable. These glasses can be formed without resorting to unusually rapid quenching. Indeed, some of the present glasses can be cooled in air in a standard, metal mold without incurring devitrification.

The key feature of the present invention is the use of at least two alkali metal oxides, preferably three, as modifying oxides in a tungstate, molybdate, or vanadate glass composition. For example, a ternary glass melt, having a composition consisting, in mole %, of 20% $Na_2O$, 20% $K_2O$, and 60% $WO_3$, can be molded to a transparent glass by cooling with an unheated, metal press. Further, a quaternary glass melt, composed of 15% $Li_2O$; 10% $Na_2O$; 15% $K_2O$; and 60% $WO_3$, was cooled in air in a standard metal mold to form a 1 cm. thick glass body. The body was transparent, colorless, and free of any apparent devitrification. In general, a glass with three alkali metal oxides in its composition is more stable than one with only two alkali metal oxides in its composition.

Compositional studies have shown that the $WO_3$ content in tungstate glasses can be completely replaced by $MoO_3$, thus forming a molybdate glass, or by $VO_{2.5}$, thus forming a vanadate glass. It may also be replaced by up to about 15% $UO_3$, or by up to about 35% $CrO_3$. These replacements may be in part, or in mixtures, or as individual, and glass stability persists, providing the mixture of alkali metal oxides is maintained.

The glass composition of the present invention thus consists essentially of, as calculated in mole %, of 50–70% of one or more glass-forming oxides selected from the group consisting of $WO_3$, $MoO_3$, $VO_{2.5}$, $UO_3$, $CrO_3$, providing the $UO_3$ and the $CrO_3$ contents do not exceed 15% and 35% respectively. As modifying oxides, the glasses may contain 20–50% $R_2O$ where R is a metal element selected from the group consisting of Li, Na, K, Cs, Rb, Ag, Tl, and mixtures, providing at least two, preferably three, of the modifying oxides are alkali metal oxides.

Optionally, the glasses may further contain, as modifying oxides, up to 10% MO where M is a metal element selected from the group consisting of Mg, Ca, Sr, Ba, Zn, Cd, Pb and 0–5% $Al_2O_3$, $Ga_2O_3$, $In_2O_3$ and $Bi_2O_3$. The glasses may be further stabilized by the presence of up to 15% $P_2O_5$, and/or $TeO_2$.

The glasses may, optionally, contain a minor amount up to about 5% of a number of compatible oxides. These include $TiO_2$, MnO, $Fe_2O_3$, CoO, NiO, CuO, $ZrO_2$, $Nb_2O_5$, $HfO_2$ and $Ta_2O_5$. These additives may provide a fluorescing ion, may provide a partial absorption of visible light as a colorant, or may permit tailoring of other glass properties such as CTE and viscosity.

Rare earth metal ions are soluble in these glasses. Accordingly, the glasses may be doped with up to 5% of a rare earth metal oxide of the lanthanide series, that series including La, Ce, Pr, Nd, Sm, Eu, Gd, Tb, Dy, Ho, Er, Tm, Yb and Lu. Thus, the present tungstate, molybdate, and vanadate glasses provide good hosts for rare earth metal ions. Owing to their lack of absorption in the visible and near infrared, these glasses, therefore, have a special utility in applications that depend on the fluorescence of such ions.

Current interest is focused on erbium as a rare earth dopant because of its fluorescence in the 1.5 $\mu$m window of the spectrum. This is the wave length window of practical commercial interest in the telecommunications industry at the present time. However, it is not difficult to foresee that additional bandwidth will be required in the future. Thus, interest in the 1.46 $\mu$m window, where thulium fluoresces, can be anticipated. While these are the rare earth dopants having a present potential, the use of other elements as dopants may become desirable to meet future needs.

The invention is further described with respect to the accompanying drawing wherein FIG. 1 is a graphical representation comparing the fluorescence of an erbium doped, alkali tungstate glass of the present invention with that of a prior art alkali metal silicate glass doped with erbium. Wavelengths in nm are plotted on the horizontal axis in the drawing, and fluorescent intensities are plotted in arbitrary units (a.u.) on the vertical axis. Curve A is the fluorescent intensity spectrum for a typical glass of the present invention. Curve B is the corresponding fluorescent intensity spectrum for the comparison glass.

The full width half-length (FWHM) value for each glass is shown by horizontal dotted lines. This is an arbitrary, but commonly accepted, measurement of band width. It will be observed that the FWHM value for the present glass (A) is about 42 nm. whereas that for the comparison glass is about 32 nm. The superiority of the present glass, typically found in the presently claimed glasses, is apparent.

Figure 2:
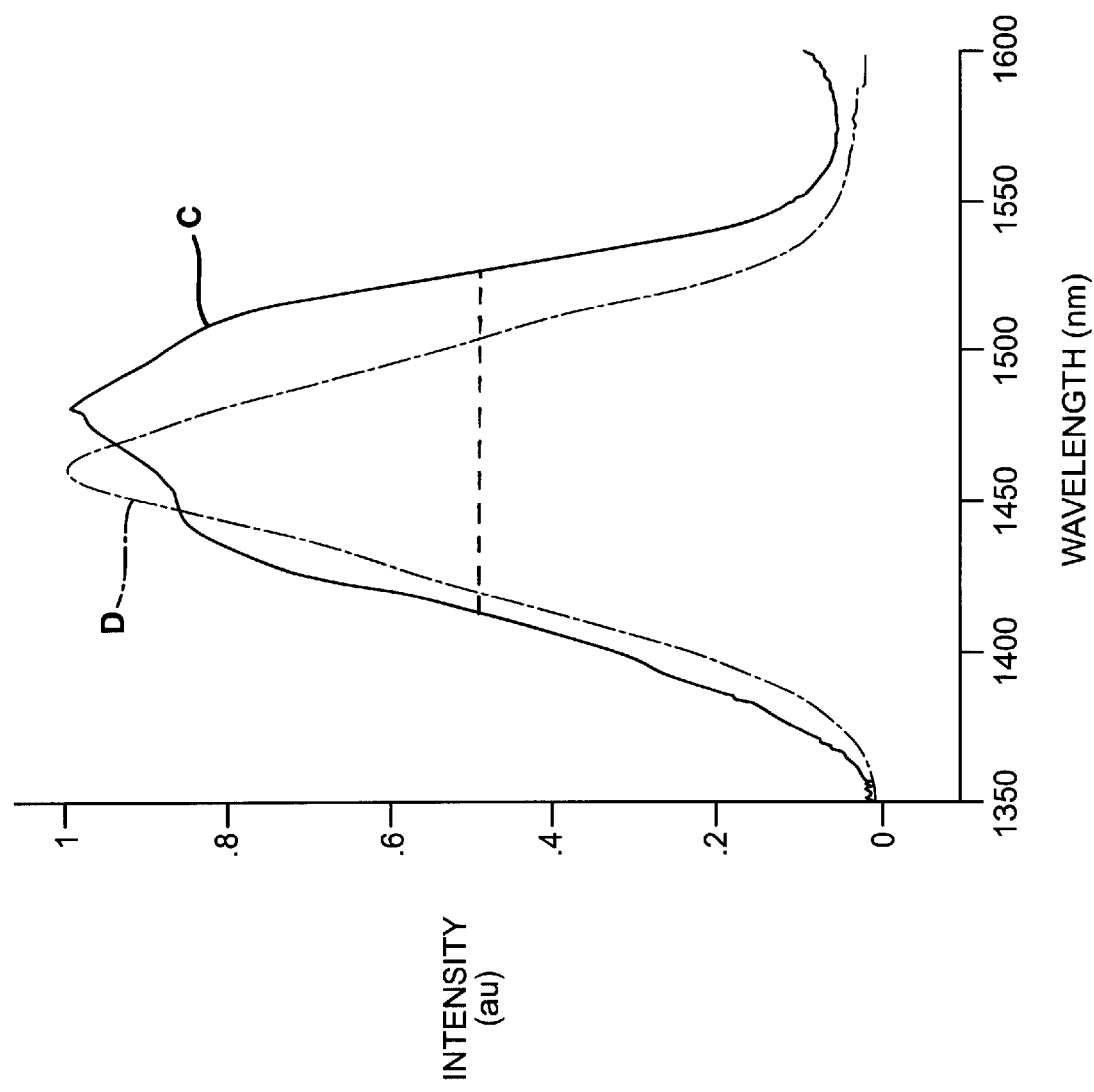
FIG. 2 is a graphical representation comparing the fluorescence of a thulium-doped glass of the present invention with that of a prior art, thulium-doped glass.

FIG. 2 is also a graphical representation with wavelength plotted in nm on the horizontal axis, and fluorescent intensity in arbitrary units (a. u.) on the vertical axis. This FIGURE compares the fluorescent intensity, curve C, for a present glass doped with thulium (Tm) with that, curve D, for a Tm-doped fluorozirconate glass known by the acronym ZBLAN. The emission from the Tm ion in each glass is in the 1.46 $\mu$m region.

Again, the FWHM value for each glass is shown by the dotted, horizontal line midway up the curve. The breadth of the Tm emission band in the present glass (113 nm FWHM) is significantly broader than that in the comparison glass (84 nm FWHM). This is desirable for WDM amplifiers operating in the 1.46 micron region. The present tungstate glasses, doped with Tm, have a greater 1.46 micron quantum efficiency than silicate glasses because of their lower maximum phonon energy (MPE).

Raman spectroscopic measurements indicate that the MPE of the present tungstate glasses is 940 $cm^{-1}$. This is less than the 1000 $cm^{-1}$ MPE value for silicate glasses. However, phonon side-band spectroscopy measurements on a europium-doped, tungstate glass demonstrate that the MPE that is coupled to a rare earth metal dopant, which is the effective MPE value, is only 790 $cm^{-1}$. This is comparable to the corresponding values for aluminate and germanate glasses.

Figure 3:
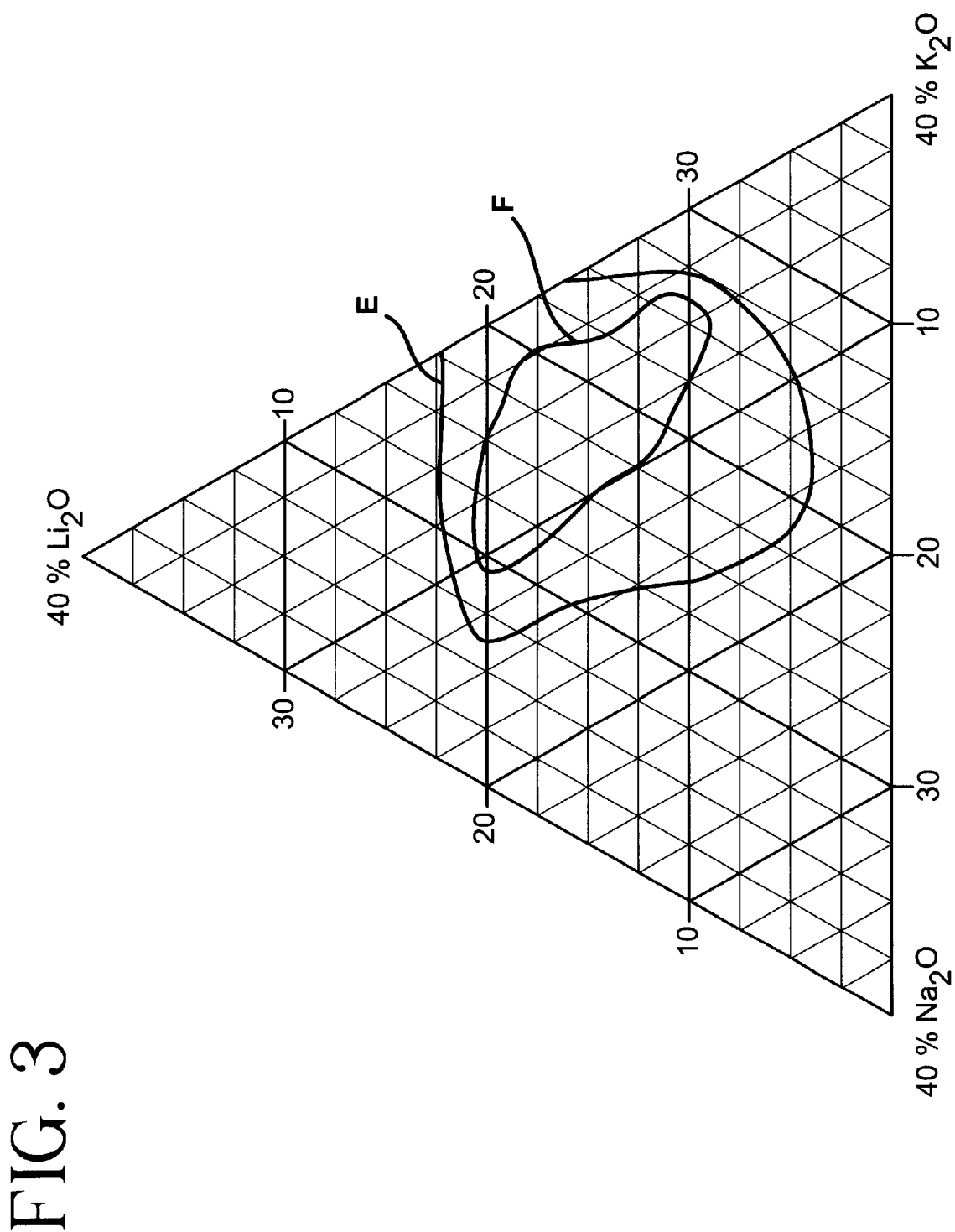
FIG. 3 is a ternary composition diagram for alkali metal tungstate glasses composed of 60 mol percent $WO_3$ and the remainder alkali metal oxides.

FIG. 3 is a ternary composition diagram for alkali metal tungstate glasses composed of 60 mol percent $WO_3$ and 40 mol percent of alkali metal oxide ($R_2O$). The apex of the diagram represents 40% $Li_2O$. The right hand end of the base line represents 40% $K_2O$, while the left hand end represents 40% $Na_2O$. In each case the remainder is 60% $WO_3$.

In FIG. 3, the larger enclosure E defines compositions of glass having a thermal stability index ($T_x$–$T_g$) values of at least 75° C. The smaller enclosure F defines compositions of glasses having a $T_x$–$T_g$ value of at least 100° C. Tx is the temperature at which crystallization is encountered as a glass is heated. $T_g$ is the transition temperature for a glass. For forming purposes, e.g. fiber fabrication, it is desirable to obtain as great a difference in these values as is compatible with other desired properties.

Figure 4:
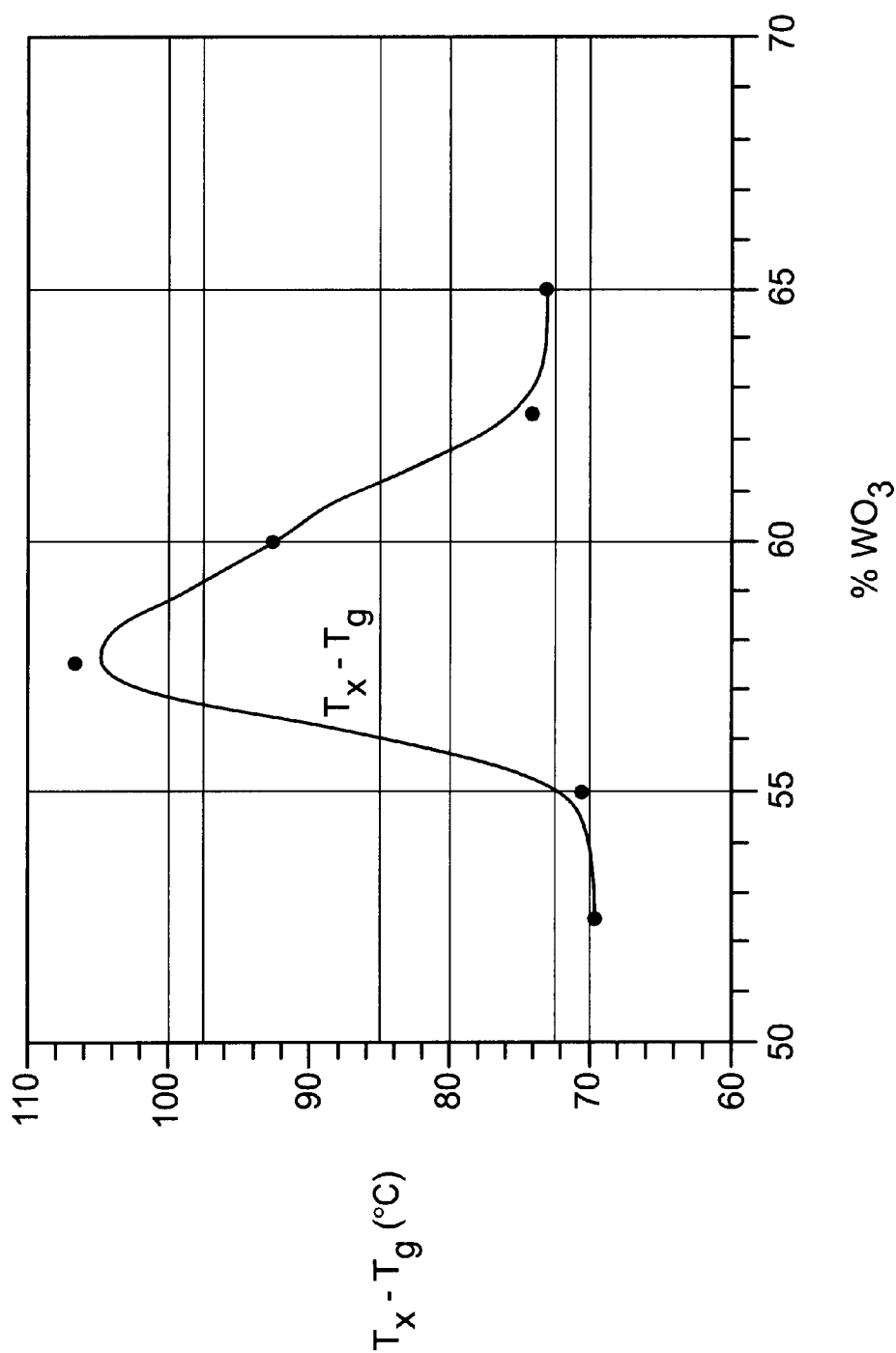
FIGS. 4 and 5 are graphical representations of thermal stability index values for glasses in accordance with the present invention.
Figure 5:
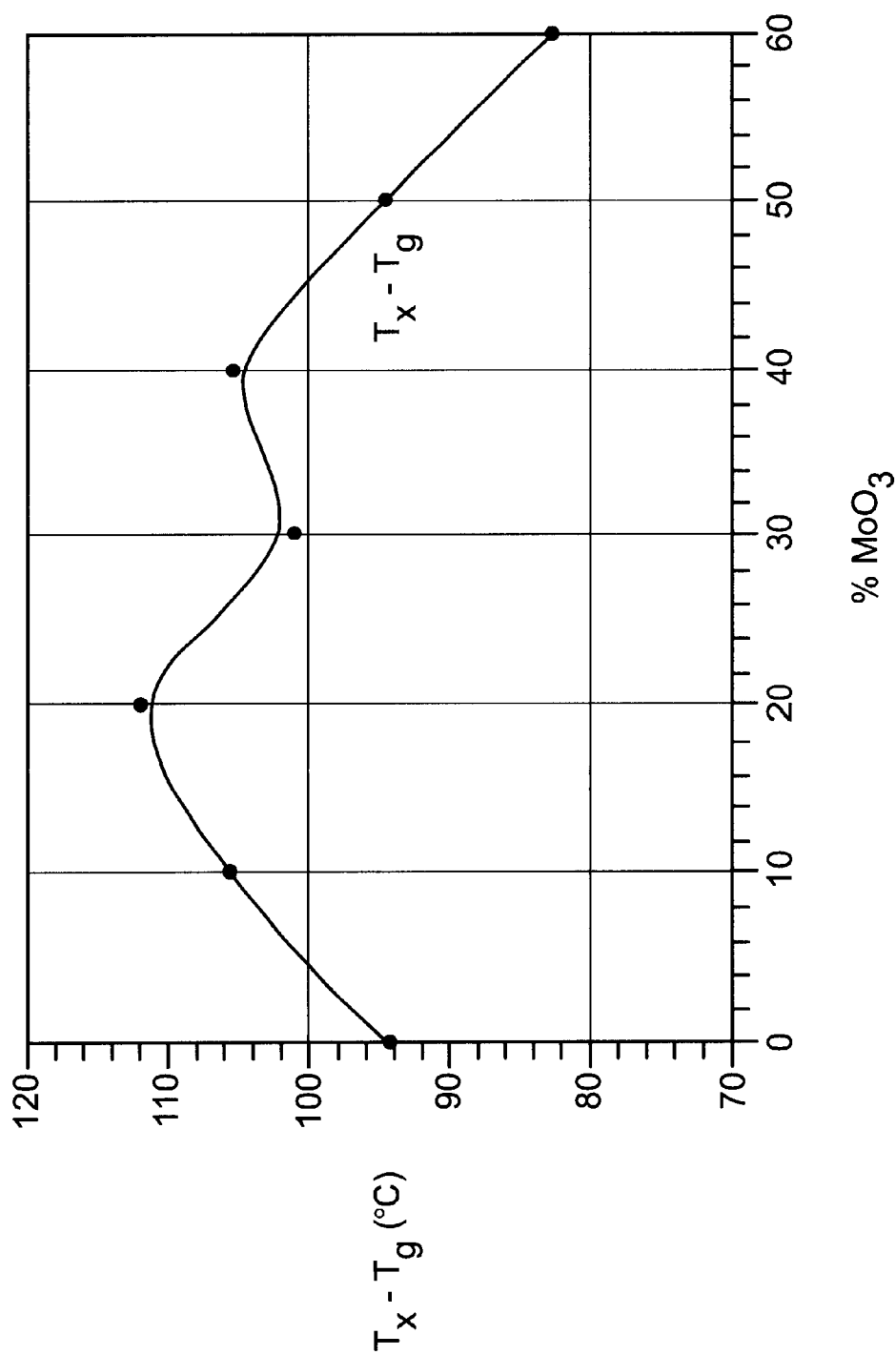

FIGS. 4 and 5 are graphical representations of the thermal stability index ($T_x$–$T_g$) values for alkali metal tungstate and molybdotungstate glasses, respectively. The index values, in each FIGURE, are plotted on the vertical axis.

In FIG. 4, mol % $WO_3$ is plotted on the horizontal axis. The remainder of each composition is composed of the three alkali metal oxides, $Li_2O$, $Na_2O$ and $K_2O$ in a mol ratio of 2:2:3.

In FIG. 5, mol % $MoO_3$ is plotted on the horizontal axis. The mol % $WO_3$ content is the difference between 60 and the mol % of $MoO_3$. The remainder of each composition is 40 mol % of the three alkali metal oxides $Li_2O$:$Na_2O$:$K_2O$ in a mol ratio of 3:2:3, i.e. 15% $Li_2O$, 10% $Na_2O$ and 15% $K_2O$.

The invention will now be described with respect to specific examples. The TABLE below shows the compositions, calculated on the oxide basis in mol percent, for several illustrative examples of the inventive glasses.

TABLE

|  | 1 | 2 | 3 | 4 | 5 | 6 | 7 | 8 | 9 | 10 | 11 | 12 | 13 |
|---|---|---|---|---|---|---|---|---|---|---|---|---|---|
| $Li_2O$ | 20 | 15 | 10 | 10.6 | 15 | 15 | 15 | 10 | 15 | 15 | 10 | 15 | 15 |
| $Na_2O$ | 20 | 10 | 15 | 15.9 | 10 | 10 | 10 | 10 | 10 | 10 | 10 | 10 | 10 |
| $K_2O$ | — | 15 | 15 | 15.9 | 15 | 15 | 15 | 20 | 10 | 15 | 20 | 15 | 15 |
| BaO | — | — | — | — | — | — | — | — | 5 | — | — | — | — |
| $WO_3$ | 60 | 60 | 52.5 | 57.5 | 50 | — | 40 | — | 60 | 48 | — | 60 | 60 |
| $MoO_3$ | — | — | — | — | — | — | 20 | 60 | — | — | 42 | — | — |
| $VO_{2.5}$ | — | — | — | — | 10 | 60 | — | — | — | — | — | — | — |
| $UO_3$ | — | — | 7.5 | — | — | — | — | — | — | — | — | — | — |
| $CrO_3$ | — | — | — | — | — | — | — | — | — | 12 | 18 | — | — |
| $Tm_2O_3$ | — | — | — | — | — | — | — | — | — | — | — | 0.5 | — |
| $Eu_2O_3$ | — | — | — | — | — | — | — | — | — | — | — | — | 0.5 |
| $T_g$ | 281 | 278 | 271 | 260 | 260 | 173 | 247 | 192 | 291 | 250 | 165 | — | — |
| $T_x$ | 350 | 372 | 412 | 367 | 403 | 256 | 359 | 256 | 387 | 385 | 233 | — | — |
| $\Delta T$ | 69 | 94 | 141 | 107 | 143 | 83 | 112 | 64 | 96 | 135 | 68 | — | — |

Glasses having compositions as shown in the TABLE were melted by first mixing a batch in customary manner. The glass-forming components, as well as lanthanide components, were introduced as oxides. The alkali metal oxides and BaO were introduced as either the nitrate or the carbonate. The batch was manually mixed and placed in a 96% silica, or a gold, crucible. The crucible was introduced into an electric furnace operating at 550–750° C., to melt the batch. Melting time was on the order of 30–60 minutes. The molten glass was then formed and the formed body was annealed at a temperature near the transition temperature ($T_g$) of the glass.

What is claimed is:

1. Alkali tungstate, molybdate and vanadate glasses, the compositions of which consist essentially of 15 to 70 mol. percent of at least one oxide selected from the group consisting of $WO_3$, $MoO_3$ and $VO_{2.5}$, 0–35% $CrO_3$, 0–15% $UO_3$, the total $WO_3$ plus $MoO_3$ plus $VO_{2.5}$ plus $CrO_3$ plus $UO_3$ being 50–70%, 20–50% $R_2O$ where R represents at least two elements selected from the group consisting of Li, Na, K, Rb, Cs, Ag and Tl, and optionally containing 0–10% MO where M is selected from the groups of elements consisting of Ca, Ba, Sr, Mg, Cd, Pb, 0–5% $X_2O_3$ where x is at least one element selected from the group consisting of Al, Ga, In and Bi, 0–15% $P_2O_5$ and/or $TeO_2$ and 0–5% of a rare earth oxide selected from the lanthanide series.

2. A glass composition in accordance with claim 1 wherein the composition contains at least three alkali metal oxides where the alkali metals are selected from the group consisting of Li, Na, K, Rb, Cs.

3. A glass composition in accordance with claim 2 wherein the alkali metal ions are Li, Na, and K.

4. A glass composition in accordance with claim 1 further including, in its composition, up to 10% of at least one stabilizing oxide selected from the group consisting of MgO, CaO, SrO, BaO, ZnO, CdO and PbO.

5. A glass composition in accordance with claim 1 further including in its composition up to 15% of $P_2O_5$ and/or $TeO_2$ as a stabilizing oxide.

6. A glass composition in accordance with claim 1 which further includes up to 5% of a rare earth metal of the lanthanide series.

7. A glass composition in accordance with claim 1 in which the selected oxide is $WO_3$.

8. A glass composition in accordance with claim 7 in which the glass composition includes, in addition to $WO_3$ at least one oxide selected from $MoO_3$, $VO_{2.5}$, $CrO_3$ and $UO_3$.

9. A glass composition in accordance with claim 1 including, in its composition, up to about 5 mol percent, individually or in total, of the group of oxides consisting of $TiO_2$, MnO, $Fe_2O_3$, CoO, NiO, CuO, $ZrO_2$, $Nb_2O_5$, $HfO_2$ and $Ta_2O_5$.

10. A component for a telecommunications system embodying a glass member, the composition of the glass being essentially that described in claim 1 and the glass having a $T_x$–$T_g$ value of at least 100° C.

11. A component in accordance with claim 10 wherein the glass has a composition that contains at least three alkali metal oxides selected from the group consisting of Li, Na, K, Rb and Cs.

12. A component in accordance with claim 10 wherein the glass has a composition that includes up to 5% of a rare earth metal of the lanthanide series.

13. A component in accordance with claim 10 wherein the glass is doped with erbium ions and has a fluorescent emission band in the 1.5 μm region of the spectrum.

14. A component in accordance with claim 10 wherein the glass is doped with thulium ions and has a fluorescent emission band in the 1.46 μm region of the spectrum.

15. A component in accordance with claim 10 that is an optically transparent fiber.

16. A component in accordance with claim 10 that is an amplifier embodying a fiber having a composition that includes up to 5% of a rare earth metal of the lanthanide series.

* * * * *